US009614900B1

(12) United States Patent
Jain et al.

(10) Patent No.: US 9,614,900 B1
(45) Date of Patent: Apr. 4, 2017

(54) MULTI-PROCESS ARCHITECTURE FOR A SPLIT BROWSER

(71) Applicant: Amazon Technologies, Inc., Reno, NV (US)

(72) Inventors: Saral Jain, Bellevue, WA (US); Ivan King Yu Sham, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 14/309,691

(22) Filed: Jun. 19, 2014

(51) Int. Cl.
*G06F 15/16* (2006.01)
*H04L 29/08* (2006.01)
*H04L 29/06* (2006.01)

(52) U.S. Cl.
CPC .............. *H04L 67/10* (2013.01); *H04L 63/10* (2013.01)

(58) Field of Classification Search
USPC .......................................................... 709/217
See application file for complete search history.

(56) References Cited

U.S. PATENT DOCUMENTS

| 6,430,624 | B1 * | 8/2002 | Jamtgaard | G06F 17/30899 707/E17.119 |
| 6,493,751 | B1 * | 12/2002 | Tate | H04L 41/0843 370/254 |
| 6,871,236 | B2 * | 3/2005 | Fishman | H04L 29/06 709/213 |
| 7,025,209 | B2 * | 4/2006 | Hawkins | G06F 17/3089 707/E17.116 |
| 7,668,809 | B1 * | 2/2010 | Kelly | G06F 17/30528 705/5 |
| 7,979,457 | B1 * | 7/2011 | Garman | G06F 17/30864 705/26.8 |
| 8,238,540 | B1 * | 8/2012 | Duva | H04M 3/51 379/265.01 |
| 8,479,271 | B1 * | 7/2013 | Berg | H04W 40/02 713/151 |
| 8,539,338 | B2 * | 9/2013 | Zhu | G06F 17/30902 715/200 |
| 8,700,699 | B2 * | 4/2014 | Shen | H04L 67/02 709/203 |

(Continued)

OTHER PUBLICATIONS

Amazon's Silk is more than just a browser: its a cloud OS for the client, Sep. 2011, Wired, pp. 1-8.*

(Continued)

*Primary Examiner* — Alicia Baturay
(74) *Attorney, Agent, or Firm* — Knobbe, Martens, Olson & Bear, LLP (57) ABSTRACT

A multi-process browser architecture is provided that splits the browser process and the renderer processes. The browser process may run on a user device and the renderer processes may run on a renderer server accessible by the user device. The browser process running on the user device can direct the renderer server to generate a new renderer process each time a user elects to open a new browser window or tab. The renderer process running on the renderer server can determine what content resources are needed to render a page and request the resources. Once the content resources are obtained, the appropriate renderer process can begin generating a layout of the page. The renderer process may transmit the layout to the browser process such that the page can be displayed on the user device.

15 Claims, 5 Drawing Sheets

(56) References Cited

U.S. PATENT DOCUMENTS

| | | | | |
|---|---|---|---|---|
| 8,762,878 B1* | 6/2014 | Weber | G06F 3/0483 | 715/777 |
| 8,762,879 B1* | 6/2014 | Goodger | G06F 17/30899 | 715/738 |
| 8,781,105 B1* | 7/2014 | Duva | H04M 3/51 | 379/201.01 |
| 8,837,318 B2 | 9/2014 | Anthony, Jr. | H04W 40/24 | 370/252 |
| 8,880,594 B2* | 11/2014 | Dillon | G06F 17/30902 | 705/32 |
| 8,910,070 B2* | 12/2014 | Goodger | G06F 17/30905 | 715/764 |
| 8,989,141 B2* | 3/2015 | Kalmbach | H04W 88/08 | 370/331 |
| 9,001,733 B2* | 4/2015 | Kalmbach | H04W 88/08 | 370/328 |
| 9,003,310 B2* | 4/2015 | Johansson | G06F 9/46 | 705/14.49 |
| 9,070,211 B1* | 6/2015 | Kroeger | G06T 11/00 | |
| 9,112,792 B2* | 8/2015 | Berg | H04L 45/22 | |
| 9,292,367 B2* | 3/2016 | Mickens | G06F 9/4856 | |
| 2006/0224973 A1* | 10/2006 | Albrecht | G06F 9/4443 | 715/760 |
| 2006/0224976 A1* | 10/2006 | Albrecht | G06F 9/4443 | 715/760 |
| 2006/0224977 A1* | 10/2006 | Albrecht | G06F 9/4443 | 715/760 |
| 2006/0224978 A1* | 10/2006 | Albrecht | G06F 9/4443 | 715/760 |
| 2006/0224979 A1* | 10/2006 | Albrecht | G06F 8/38 | 715/760 |
| 2009/0204964 A1* | 8/2009 | Foley | G06F 21/53 | 718/1 |
| 2010/0100928 A1* | 4/2010 | Gasparini | H04L 9/3213 | 726/1 |
| 2010/0312858 A1* | 12/2010 | Mickens | G06F 17/30902 | 709/219 |
| 2011/0029528 A1* | 2/2011 | Lee | G06F 17/2241 | 707/737 |
| 2011/0228763 A1* | 9/2011 | Magnus | H04M 1/72561 | 370/352 |
| 2012/0060083 A1* | 3/2012 | Yuan | G06F 17/30899 | 715/234 |
| 2012/0084630 A1* | 4/2012 | Meiskey | G06F 17/30867 | 715/205 |
| 2012/0110438 A1* | 5/2012 | Peraza | G06F 17/214 | 715/243 |
| 2012/0203798 A1* | 8/2012 | Gifford | G06F 19/322 | 707/783 |
| 2013/0097440 A1* | 4/2013 | Bar-Zeev | G06F 1/3203 | 713/320 |
| 2013/0117658 A1* | 5/2013 | Fidler | G06F 17/3061 | 715/234 |
| 2013/0185349 A1* | 7/2013 | Broda | G06F 9/4443 | 709/203 |
| 2013/0198608 A1* | 8/2013 | Krassner | G06F 17/2247 | 715/234 |
| 2013/0198612 A1* | 8/2013 | Ceze | G06F 17/30899 | 715/235 |
| 2015/0161219 A1* | 6/2015 | Bendiabdallah | G06F 17/3089 | 707/722 |
| 2015/0350045 A1* | 12/2015 | Fan | H04L 43/0823 | 709/224 |
| 2016/0142466 A1* | 5/2016 | Doi | G06F 3/0481 | 715/738 |

OTHER PUBLICATIONS

Covert, A., What Is Amazon Silk?, Sep. 28, 2011, Gizmodo, pp. 1-3.*

Internet Explorer 9 (IE9), Jul. 2012, PC Magazine, pp. 1-10.*

Jackson, J., Amazon's Silk browser one-ups Opera's approach to the Web, Sep. 28, 2011, InfoWorld, pp. 1-2.*

Mello, Jr., J.P., Amazon Silk: Pros and Cons, Sep. 2011, PC World, pp. 1-2.*

Multi-process Architecture, Sep. 2008, Chromium Blog, pp. 1-6.*

Pearce, R., Opera Answers Amazon's Cloud-powered Silk Browser, Oct. 2011, PC World, pp. 1-2.*

Schonfeld, E., The Kindle Fire will have a whole new "Cloud Accelerated" Mobile browser called Amazon Silk, Sep. 2011, TechCrunch, pp. 1-2.*

* cited by examiner

MULTI-PROCESS ARCHITECTURE FOR A SPLIT BROWSER

BACKGROUND

In the past, operating systems were designed such that applications ran in the same process. As a result, misbehaving applications could take down the entire operating system. Accordingly, modern operating systems put applications into separate processes and restrict access to data between the processes. Thus, if one application crashes, the other applications and the operating system can continue to operate properly.

Browsers may suffer from the same problems as past operating systems. A browser, for example, may allow a user to view pages (e.g., network or content pages, such as web pages) in different tabs. While this functionality is beneficial to the user, any issue with the browser or with a specific tab can take down the entire browser.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

As described above, an entire browser application may be susceptible to issues that occur within a single browser tab. For example, any issue with the browser application (e.g., a browser plug-in or extension) or with a specific tab in the browser application can take down the entire browser application. Often, issues crop up in the rendering of a page (e.g., a network or content page, such as a web page). To protect the entire browser application from the problems described above, some recently developed browser applications use a multi-process architecture. These traditional multi-process browser applications have separate renderer processes for each open browser tab. Access to data within each process is then restricted from other processes and the operating system as a whole. Thus, if there is a problem with one open browser tab, the problem may not permeate to the other open browser tabs or the entire browser application.

The main process that runs the user interface and that manages tab and plugin processes in the traditional multi-process browser application is referred to herein as the "browser process." Tab-specific processes in the traditional multi-process browser application are referred to herein as "render processes" or "renderer processes." For example, the browser process and the renderer processes can be implemented according to the Chromium multi-process architecture, which includes browser and renderer processes. The browser process may handle network communications and relay content resources to the appropriate renderer process. The browser process can communicate with each renderer process via inter-process communication (IPC). Each renderer process may be associated with a specific window or tab and be configured to render a page associated with the respective window or tab. When a user chooses to open a new browser window or tab, the browser application may generate a new renderer process associated with the new browser window or tab. The renderer processes may have restricted access to other renderer processes, a file system of the operating system that executes the browser application, and/or a network to which a user device may be connected. Thus, if a renderer process crashes, the crash typically will not affect the stability of the other renderer processes or the browser process.

Despite these advantages of the traditional multi-process browser application, the browser and renderer processes are run on the same user device. Generally, the renderer process, in rendering a page, may consume a large amount of resources and computing power. For user devices that have limited resources, the amount of resources and computing power consumed by the renderer process can be problematic. The traditional multi-process browser application may experience an increased latency and/or cause other applications to stop or experience reduced functionality. Furthermore, these problems may be exacerbated depending on the number of renderer processes open and running at any given time.

Accordingly, systems and methods for implementing a split browser are described herein to take advantage of a multi-process browser architecture while offloading some of the processing to other devices with more computing resources. In an embodiment, the processing is split such that the browser process runs on the user device and the renderer processes run on a separate renderer server accessible by the user device. The browser process running on the user device can direct the renderer server to generate a new renderer process each time a user elects to open a new browser window or tab. The renderer process running on the renderer server can determine what content resources are needed to render a page and request the browser process to obtain the resources from a host server. Once the content resources are obtained, the browser process can transmit the content resources to the renderer server and the appropriate renderer process can begin rendering the page. Alternatively, the appropriate renderer process can directly obtain the resources from the host server and can begin rendering the page. For example, the renderer process may parse the code of the page (e.g., the HTML, XML, etc.) into a parse tree (e.g., a document object model (DOM tree), construct a render tree, and generate a layout (or a rendering of the page). The renderer process may transmit the layout (or the rendered page) to the browser process such that the page can be displayed on the user device.

The same renderer server may run renderer processes for a plurality of user devices. To maintain the integrity of the processes and the browser applications as a whole, the renderer server may "sandbox" the renderer processes such that access to the data of a renderer process is restricted (e.g., the other renderer processes and/or other applications running on the renderer server may have little to no access to the data of the renderer process). In some embodiments, a plurality of renderer servers may be available to run various renderer processes. A user device may request the same renderer server to run all renderer processes associated with the user device's browser process. Alternatively, the user device may request a plurality of renderer servers to run the renderer processes associated with the user device's browser process.

As described above, the browser and renderer processes in traditional multi-process browser applications generally communicate via IPC messages. The IPC messages, however, take advantage of shared resources (e.g., shared memory) because the browser and renderer processes are co-located (e.g., located on the same device). When the browser and renderer processes are not co-located, such as with the split browser described herein, the communications between the processes are a challenge as resources may not be shared. Furthermore, when the processes are co-located, the browser process may expect responses from a renderer process within a set period of time (e.g., 1 ms). However, when the processes are not co-located, network conditions may affect the response time of a renderer process. A traditional multi-process browser application may stall, close, or crash if the browser renderer cannot determine whether a response is expected or if the browser renderer does not receive a response after a certain period of time. Thus, the traditional multi-process browser application based on IPC messages and shared memories, as described above, may not operate correctly if the browser and renderer processes are merely split between devices.

To alleviate some of these concerns, the split browser described herein may encapsulate communications between the browser process running on the user device and the renderer processes running on the renderer server in standard or custom network protocol messages (e.g., transmission control protocol/Internet protocol (TCP/IP) messages, messages that are transmitted using custom networking protocols, etc.). In some embodiments, the browser application running on the user device may include a layer that informs the browser process whether a response from a renderer process is expected and/or a time before a response is expected to arrive. Thus, the split processes implementation described herein may allow the browser application to operate in a stable manner.

System Components

Figure 1:
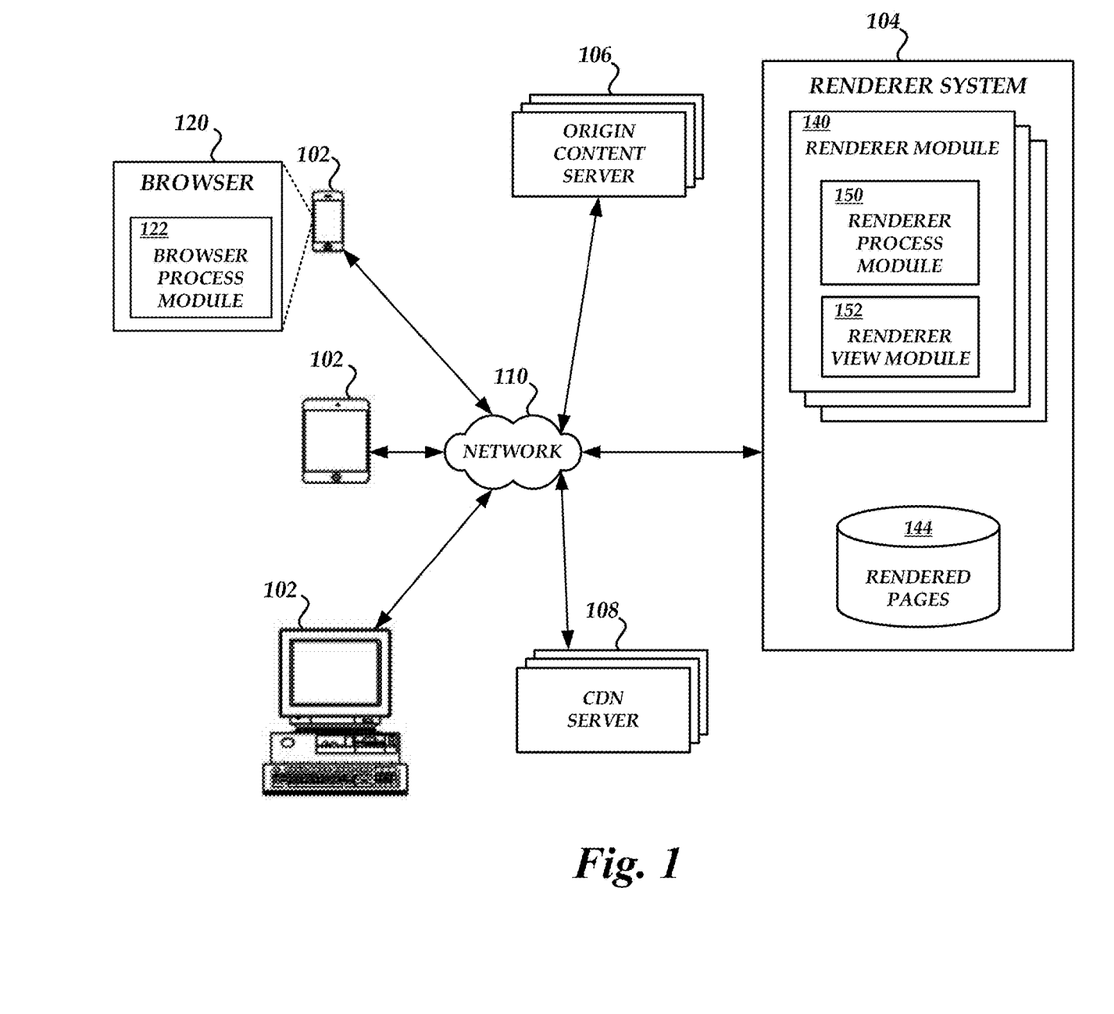
FIG. 1 illustrates a multi-process browser architecture environment with a user device that runs a browser process and a renderer system that runs one or more renderer processes according to one embodiment.

FIG. 1 illustrates a multi-process browser architecture environment with a user device that runs a browser process and a renderer system that runs one or more renderer processes according to one embodiment. The network environment shown in FIG. 1 includes various user devices 102, a renderer system 104, and various content sources, including origin content servers 106 and content delivery network ("CDN") servers 108. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple renderer systems 104 may be used. For example, separate renderer systems 104 may be located so that they are close (in either a geographical or networking sense) to groups of current or potential user devices 102 or content sources 106, 108. In such a configuration, a user device 102 may request that a renderer system 104 to which it is closest run one or more renderer processes, rather than all user devices 102 requesting a single renderer system 104 to run all renderer processes.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the renderer system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The browser application 120 may include a browser process module 122 that implements a browser process. For example, the browser process module 122 may be associated with one or more renderer processes run on the renderer system 104. The browser process module 122 may obtain requested content from an origin content server 106 and/or CDN server 108 and relay the content resources to the appropriate renderer process run on the renderer system 104. The browser process module 122 may also handle basic browser commands (e.g., navigation commands, new tab creation commands, etc.), user preferences, browser plug-ins, and/or the like. In an embodiment, the browser process module 122 is implemented using the Chromium browser process.

The renderer system 104 can be a computing system configured to execute one or more renderer processes associated with one or more of the user devices 102. For example, the renderer system 104 can be a physical server or group of physical servers that may be accessed via the network 110. In some embodiments, the renderer system 104 may be a proxy server, a system operated by an internet service provider (ISP), an intermediary system (e.g., it operates as an intermediary between user devices and content sources, such as the origin content server 106 and/or the CDN server 108), and/or or some other device or group of devices that execute renderer processes on behalf of the user devices 102.

The renderer system 104 may include various modules, components, data stores, and the like to execute the one or more renderer processes. For example, the renderer system 104 may include one or more renderer modules 140 that each implements a renderer process. A renderer module 140 may be associated with a specific user device 102 and its browser process module 122. For example, a renderer module 140 may be associated with a window or tab open in the browser application 120 of a specific user device 102. In an embodiment, the renderer module 140 is implemented using the Chromium renderer process.

The renderer module 140 may include various modules to provide the functionality described above and in greater detail below. For example, the renderer module 140 may include a renderer process module 150 and one or more renderer view modules 152 to implement the renderer process. In an embodiment, the renderer process module 150 is configured to communicate with the browser process module 122 via the network 110. For example, the browser process module 122 may request and receive content resources from the browser process module 122. In some embodiments, the renderer process module 150 is further configured to communicate with the origin content server 106 and/or the CDN server 108 to obtain content resources. The renderer view module 152 may be configured to parse code of a page into a parse tree, construct a render tree, and generate a layout of a page based on communications received by the renderer process module 150.

In an embodiment, when a user elects to open a new window or tab in the browser application 120, the browser process module 122 sends a message that causes the renderer system 104 to dedicate resources to instantiate a new renderer module 140. When a user elects to close a window or tab in the browser application 120, the browser process module 122 may send a message that indicates to the renderer system 104 that the new renderer module 140 is no longer needed. The renderer system 104 may remove the new renderer module 140 and reallocate the resources originally dedicated to the new renderer module 140.

The renderer system 104 may include additional modules, components, data stores, and the like to provide the features described above and in greater detail below. For example, the renderer system 104 may include a rendered pages data store 144 that stores page layouts generated by the various renderer view modules 152. As the user manipulates the pages, the page layouts stored in the rendered pages data store 144 may be retrieved so that the renderer view module 152 can apply updates to the page layouts as necessary.

In other embodiments, not shown, the browser application 120 includes a renderer module similar to the renderer module 140. For example, the renderer module in the browser application 120 may parse code of a page into a parse tree, construct a render tree, and generate a layout of a page that can be displayed by the user device 102. Thus, simultaneously or nearly simultaneously, the browser application 120 may generate a layout of a first page for display by the browser application 120 in a first window and the renderer module 140 may generate a layout of a second page for display by the browser application 120 in a second window.

The renderer system 104 may be a single computing device, or it may include multiple distinct computing devices, such as computer servers, logically or physically grouped together to collectively operate as a renderer system. The components of the renderer system 104 can each be implemented in application-specific hardware (e.g., a server computing device) such that no software is necessary, or as a combination of hardware and software. In addition, the modules and components of the renderer system 104 can be combined on one server computing device or separated individually or into groups on several server computing devices. In some embodiments, the renderer system 104 may include additional or fewer components than illustrated in FIG. 1.

In some embodiments, the features and services provided by the renderer system 104 may be implemented as web services consumable via the communication network 110. In further embodiments, the renderer system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (e.g., network or content pages) from user devices 102, the renderer system 104, or other devices or service providers. In some embodiments, one or more content servers 106 may be associated with one or more CDN service providers (e.g., entities that manage multiple CDN servers 108), application service providers, etc.

Example Split Multi-Process Browser Architecture

Figure 2:
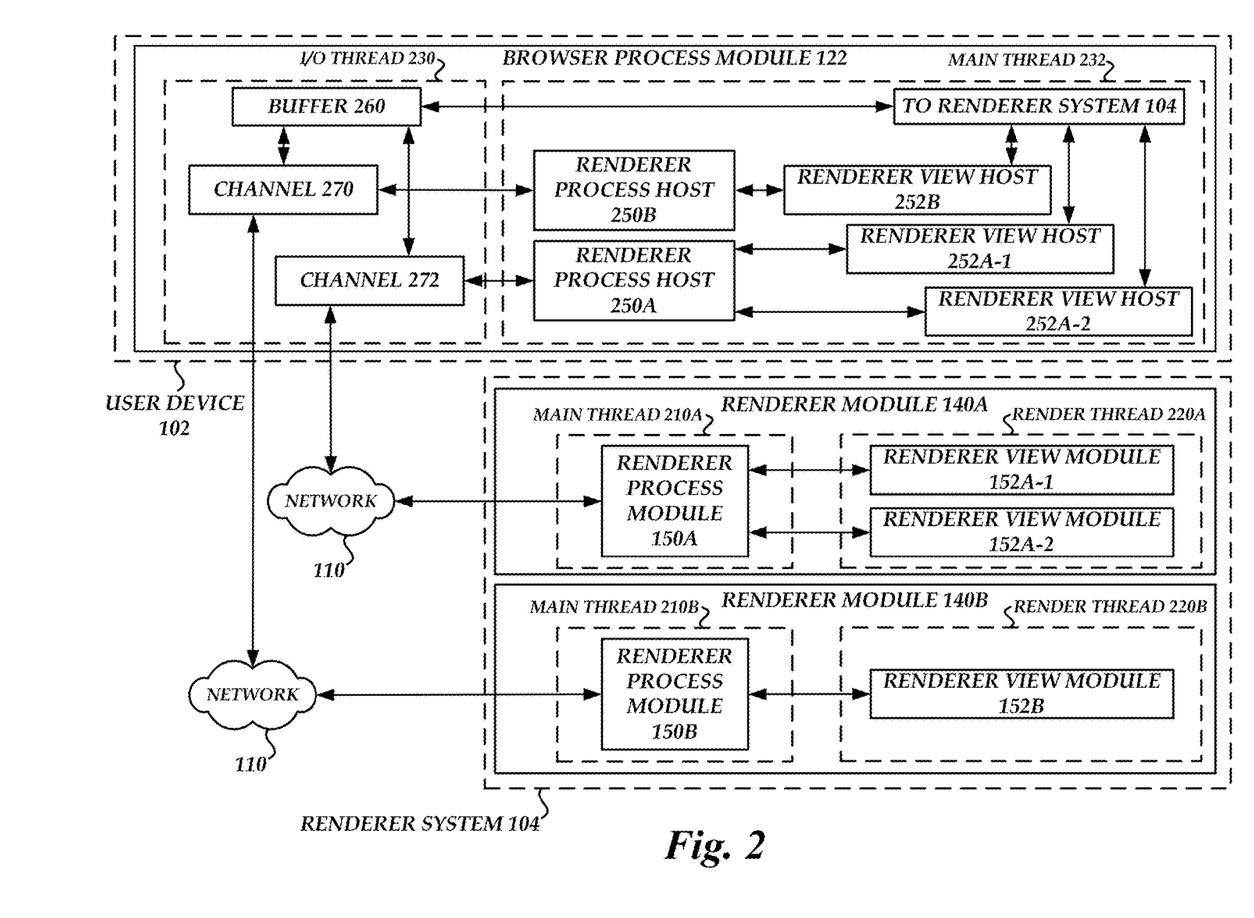
FIG. 2 illustrates a multi-process browser architecture split between a user device and a renderer system, such as the user device and the renderer system of FIG. 1.

FIG. 2 illustrates a multi-process browser architecture split between a user device and a renderer system, such as the user device 102 and the renderer system 104 of FIG. 1. As illustrated in FIG. 2, the browser module 122 communicates with renderer module 140A and renderer module 140B via the communication network 110. The renderer module 140A may represent a first window or tab open in the browser application 120 and the renderer module 140B may represent a second window or tab open in the browser application 120.

In an embodiment, the browser process module 122 includes an I/O thread 230 and a main thread 232. The I/O thread 230 may handle communications with each renderer module 140A and 140B and communications with the origin content servers 106 and CDN servers 108. When a new tab or window is open, a channel corresponding to the new tab or window may be created in the I/O thread 230. For example, as illustrated in FIG. 2, two windows or tabs may be open. Thus, the I/O thread 230 may include a channel 270 associated with the first window or tab (e.g., the renderer module 140A) and a channel 272 associated with the second window or tab (e.g., the renderer module 140B). The channel 270 may listen for messages from the renderer module 140A and forward such messages to renderer process host 250A. Likewise, the channel 272 may listen for messages from the renderer module 140B and forward such messages to renderer process host 250B. The channels 270 and 272 also may each include a filter that filters messages that can be handled by the I/O thread 230 (e.g., requests for content resources or other network requests).

The renderer process hosts 250A and 250B may be responsible for dispatching view-specific messages (e.g., messages related to a specific view, such as requests for a view to paint a region) to the appropriate renderer view host 252A-1, renderer view host 252A-2, or renderer view host 252B and may handle some non-view-specific messages (e.g., messages not specific to a view, such as requests for content resources, requests to modify a clipboard, etc.). The renderer view hosts 252A-1, 252A-2, and 252B may handle view-specific messages. The renderer view hosts 252A-1, 252A-2, and 252B may also forward messages to the renderer modules 140A or 140B via buffer 260 in the I/O thread 230. For example, the renderer modules 140A or 140B may be slow to process messages received from the renderer view hosts 252A-1, 252A-2, and 252B and the buffer 260 may serve as a queue to hold messages until the renderer modules 140A or 140B are ready to process them. As illustrated in FIG. 2, a window or tab may be associated with one or more views.

In an embodiment, each renderer module 140 includes a main thread 210A or 210B and a render thread 220A or 220B. For example, the main thread 210A may include renderer process module 150A and the main thread 210B may include renderer process module 150B. The renderer thread 220A may include renderer view modules 152A-1 and 152A-2 and the renderer thread 220B may include renderer view module 152B.

Communications between the various components in the I/O thread 230 and the main thread 232 may be IPC messages (e.g., IPC messages as implemented in Chromium). Because no memory may be shared between the browser process module 122 and the renderer modules 140A-B, the IPC messages may be generated without using memory shared between the browser process module 122 and the renderer modules 140A-B. Likewise, communications between the various components in the main thread 210A or 210B and the renderer thread 220A or 220B may be IPC messages. The channels 270 and 272 and the renderer process modules 150A and 150B may communicate with each other over the communications network 110 via messages formatted according to standard or custom networking protocols (e.g., TCP/IP). In an embodiment, IPC messages are encapsulated in the standard or custom networking protocol messages. The channels 270 and 272 and the renderer process modules 150A and 150B may extract the IPC messages from the standard or custom networking protocol messages before performing any further processing.

In an embodiment, when parsing code of a page into a parse tree, constructing a render tree, and/or generating a layout of the page, a renderer view module 152A-1, 152A-2, or 152B may desire to communicate with the browser process module 122 (e.g., to request content resources). The renderer view module 152A-1, 152A-2, or 152B may generate the message, which is passed through the renderer process module 150A or 150B and onto the I/O thread 230 via the communications network 110. The message may include an identification of the renderer module 140A or 140B that generated the message (e.g., an identification of the renderer process that generated the message). If the browser process module 122 replies to the message received from the renderer module 140A or 140B (or is otherwise sending any message to the renderer module 140A or 140B), the browser process module 122 may include the received identification in the response message such that the renderer system 104 can forward the response to the appropriate renderer module 140A or 140B.

For example, the renderer view module 152A-1 may desire content resources. The renderer view module 152A-1 may generate a message (e.g., an IPC message) requesting content resources and transmit such message to the renderer process module 150A. The renderer process module 150A may include an identification of the renderer module 140A and encapsulate the IPC message along with the identification in a standard or custom networking protocol formatted message. The renderer process module 150A may then transmit the data to the channel 272 via the communications network 110. The channel 272 may extract the IPC message and the identification from the standard or custom networking protocol formatted message before performing any analysis. Because the IPC message includes a request for content resources, the I/O thread 230 may handle the request and obtain the content resources from the origin content servers 106 and/or the CDN servers 108. Once the content resources are obtained, the content resources may be forwarded to the renderer system 104 along with the received identification via the communications network 110. Using the identification, the renderer system 104 may identify the renderer module 140A as the correct recipient of the data and forward the content resources to the renderer module 140A.

As another example, a user may perform an action (e.g., select a navigation command, such as "back," "forward," "home," etc.) that requires the repainting of a page displayed in a first tab associated with the renderer module 140A. Because the action may be a view-specific action, the renderer process host 250A may forward a view-specific message to the renderer view host 252A-1 or 252A-2. The renderer view host 252A-1 or 252A-2 may generate instructions that instruct the renderer module 140A to repaint a portion of or all of the page. The instructions may include an identification of the renderer module 140A and be transmitted to the renderer module 140A via the buffer 260 and the communications network 110. Again, the instructions may be an IPC message encapsulated in a standard or custom networking protocol message format when transmitted over the communications network 110. The renderer process module 150A may receive the standard or custom networking protocol formatted message, extract the instructions, and forward the instructions to the renderer view module 152A-1 or 152A-2. The renderer view module 152A-1 or 152A-2 may generate a new or updated layout based on the instructions and the layout may be forwarded to the browser process module 122 so that the updated page can be displayed on the user device 102.

Example Process for Rendering a Content Page

Figure 3:
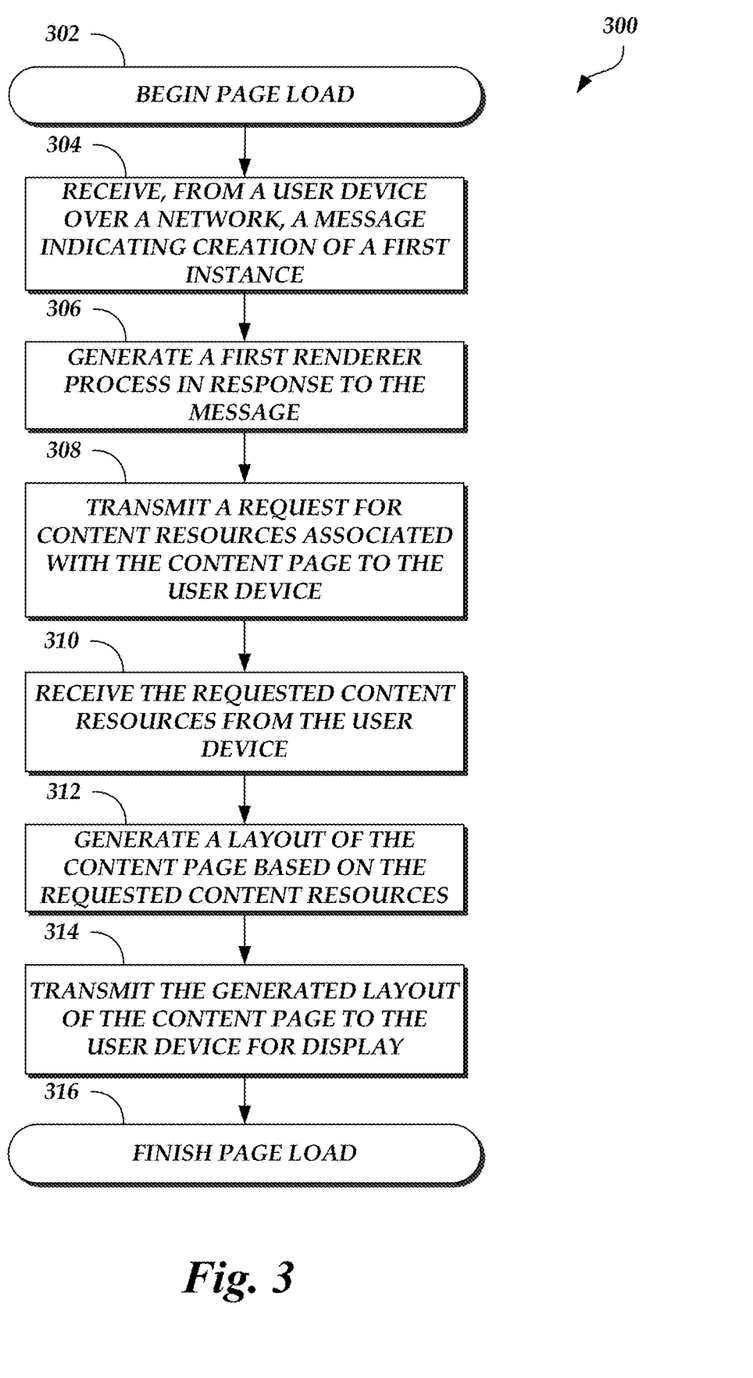
FIG. 3 illustrates a render process for rendering and displaying a content page using a multi-process browser architecture split between a user device and a renderer system.

FIG. 3 illustrates a render process 300 for rendering and displaying a content page using a multi-process browser architecture split between a user device and a renderer system. As an example, the renderer system 104 of FIG. 1 can be configured to execute the render process 300. The render process 300 begins at block 302.

At block 304, a message indicating creation of a first instance is received from a user device over a network. In an embodiment, the message is generated by the user device in response to a user electing to open a new instance (e.g., a new window or tab) to view a content page in a browser application, such as the browser application 120.

At block 306, a first renderer process is generated in response to the message. In an embodiment, generation of the first renderer process results in the renderer system 104 allocating resources to instantiate a new renderer process associated with the new tab or window. The renderer system 104 may restrict access to the data associated with the new renderer process from any other renderer processes running on the renderer system 104.

At block 308, a request for content resources associated with the content page is transmitted to the user device over the network. In an embodiment, the request includes an identification of the renderer process. The request may be an IPC message encapsulated in a standard or custom networking protocol formatted message when transmitted over the network.

At block 310, the requested content resources are received from the user device over the network. In an embodiment, the browser process running on the user device requests the content resources from the origin content servers 106 and/or the CDN servers 108.

At block 312, a layout of the content page is generated based on the requested content resources. In an embodiment, the layout is generated by the renderer view module 152.

At block 314, the generated layout of the content page is transmitted to the user device over the network for display. In an embodiment, the user device displays the content page in the new window or tab opened by the user. The user device may display the content page based on the generated layout of the content page. After the generated layout is transmitted, the render process 300 may be complete, as shown in block 316.

Example Page Displayed on a User Device

Figure 4A:
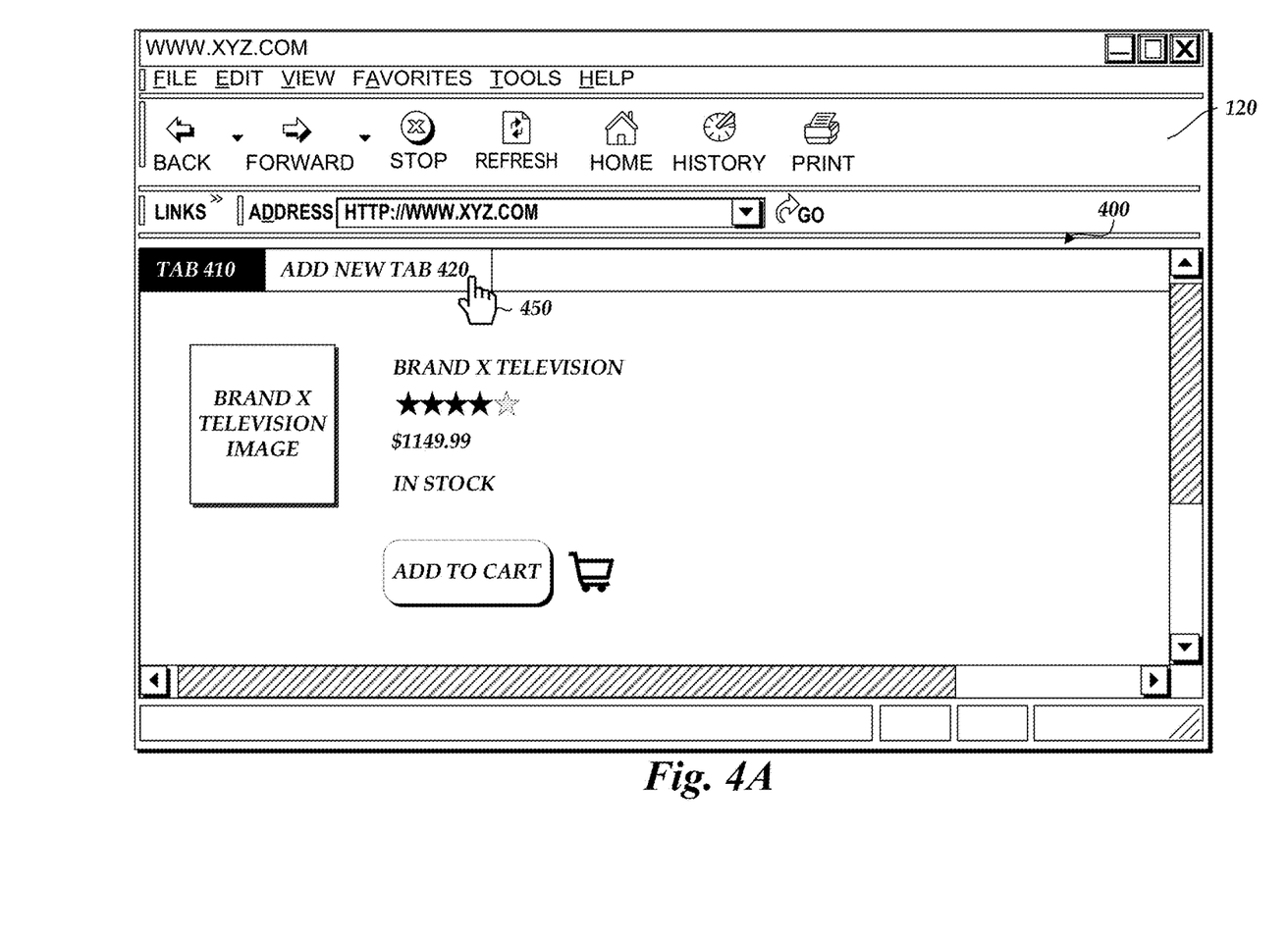
FIGS. 4A-B illustrate an example of a representation of a page, such as an HTML-based web page, displayed on a user device and rendered on a renderer system, such as the user device and renderer system of FIG. 1.
Figure 4B:
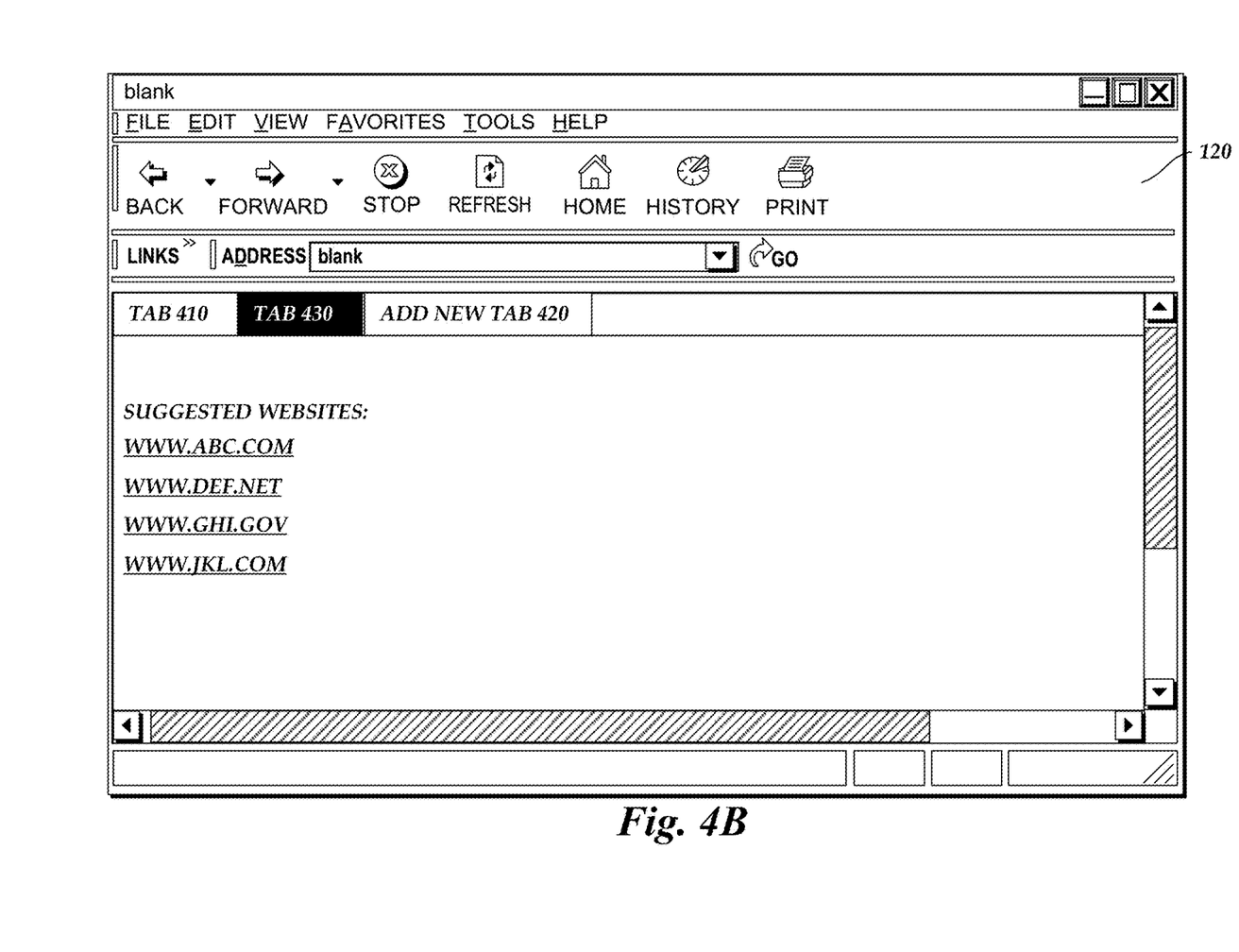

FIGS. 4A-B illustrate an example of a representation of a page 400, such as an HTML-based web page, displayed on a user device and rendered on a renderer system, such as the user device 102 and renderer system 104 of FIG. 1. The page 400 may be displayed within the user interface of the browser application 120 of the user device 102. The user device 102 may run a browser process, such as implemented by the browser process module 122. As illustrated in FIG. 4A, the page 400 includes a tab 410, the contents of which are currently displayed, and a new tab button 420. The tab 410 may be associated with a renderer process running on the renderer system 104. Access to the renderer process may be restricted such that little to none of the data associated with the renderer process may be accessed by other renderer processes running on the renderer system 104.

As illustrated in FIG. 4A, a user may elect to open a new tab by selecting the new tab button 420 using cursor 450. In an embodiment, selection of the new tab button 420 results in new tab 430 being displayed within the browser application 120, as illustrated in FIG. 4B. In other embodiments, not shown, an action (e.g., selecting a link) performed in a page that has already been loaded, such as the page 400 in the tab 410, results in the new tab 430 being displayed within the browser application 120. Selection or the performed action may also result in a message being transmitted to the renderer system 104 that causes the renderer system 104 to allocate resources for the instantiation of a new renderer process separate from the renderer process associated with the tab 410. Alternatively, selection or the performed action may result in the browser application 120 allocating resources for the instantiation of a new renderer process that is local to the user device 102. The new renderer process may be associated only with the tab 430 and may generate the layout of any page displayed within the tab 430. Thus, the new renderer process may not be able to access the data associated with the tab 410 and the renderer process associated with the tab 410 may not be able to access the data associated with the tab 430.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the browser and/or renderer processing described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of displaying a content page, the method comprising:
   as implemented by a renderer system comprising one or more computing devices, the renderer system configured with specific executable instructions,
   receiving, by the renderer system from a user device over a network, a message indicating creation of a first instance executed by a browser application running on the user device;
   generating, by the renderer system, a first renderer process in response to the message, wherein the first renderer process is associated with the first instance, and wherein the first instance is associated with a content page;
   generating, by the renderer system, a request for retrieving content resources from a host server, wherein the request for retrieving content resources is associated with the content page, and wherein the request for retrieving content resources comprises a reference to the first renderer process;
   transmitting, by the renderer system to the user device over the network, the request for retrieving content resources, wherein reception of the request for retrieving content resources causes the user device to obtain the content resources from the host server;
   receiving, by the renderer system from the user device over the network, the requested content resources;
   generating, by the first renderer process, a layout of the content page based on the requested content resources; and
   transmitting, by the renderer system to the user device over the network, the generated layout of the content page for display.

2. The computer-implemented method of claim 1, further comprising:
   receiving, by the renderer system from the user device over the network, a second message indicating creating of a second instance executed by the browser application running on the user device;
   generating a second renderer process in response to the second message, wherein the second renderer process is associated with the second instance, and wherein the second instance is associated with a second content page;
   generating a second request for second content resources associated with the second content page, wherein the second request for second content resources comprises a reference to the second renderer process;
   transmitting, by the renderer system to the user device over the network, the second request for second content resources, wherein reception of the second request for second content resources causes the user device to obtain the second content resources from a second host server;
   receiving, by the renderer system from the user device, the requested second content resources;
   generating, by the second renderer process, a layout of the second content page based on the requested second content resources; and
   transmitting, by the renderer system to the user device over the network, the generated layout of the second content page for display.

3. The computer-implemented method of claim 1, wherein access of the second renderer process to the first renderer process is restricted.

4. The computer-implemented method of claim 1, wherein generating a request for content resources associated with the content page further comprises generating an inter-process communication (IPC) protocol message without using memory shared between the first renderer process and the browser application, and wherein the IPC message comprises the request for content resources.

5. The computer-implemented method of claim 4, wherein transmitting the request for content resources further comprises:

encapsulating the IPC protocol message in a transmission control protocol/Internet protocol (TCP/IP) message; and transmitting the TCP/IP message to the user device.

6. The computer-implemented method of claim 1, further comprising:
receiving an indication of a navigation command from the user device;
generating an updated layout of the content page based on the navigation command; and
transmitting the updated layout of the content page to the user device over the network for display.

7. The computer-implemented method of claim 1, wherein the first instance is one of a tab or window in the browser application.

8. A system comprising:
a computer data repository that stores layouts of content pages, the computer data repository comprising a storage device; and
a renderer system comprising one or more computing devices, the renderer system in communication with the computer data repository and programmed to implement at least:
　a renderer that receives a request, from a user device over a network, to render a content page associated with a first renderer process, wherein the first renderer process is associated with a first instance executed by a browser application running on the user device; and
　a renderer view that generates a request for retrieving content resources from a host server, wherein the request for retrieving content resources is associated with the content page,
　wherein the renderer further transmits the request for retrieving content resources to the user device over the network,
　wherein the renderer further receives the requested content resources from the user device over the network,
　wherein the renderer view further generates a layout of the content page based on the requested content resources, and
　wherein the renderer further transmits the generated layout of the content page to the user device over the network for display.

9. The system of claim 8, wherein the renderer system is further programmed to implement:
　a second renderer that receives a request from the user device to render a second content page associated with a second renderer process, wherein the second renderer process is associated with a second instance executed by the browser application; and
　a second renderer view that generates a second request for second content resources associated with the second content page;
　wherein the second renderer further transmits the second request for second content resources over the network,
　wherein the second renderer further receives the requested second content resources over the network,
　wherein the second renderer view further generates a layout of the second content page based on the requested second content resources, and
　wherein the second renderer further transmits the generated layout of the second content page to the user device for display.

10. The system of claim 9, wherein access of the second renderer process to the first renderer process is restricted.

11. The system of claim 8, wherein the renderer view further generates an inter-process communication (IPC) protocol message without using memory shared between the renderer system and the browser application, and wherein the IPC message comprises the request for content resources.

12. The system of claim 11, wherein the renderer further:
encapsulates the IPC protocol message in a transmission control protocol/Internet protocol (TCP/IP) message; and
transmits the TCP/IP message to the user device.

13. The system of claim 8, wherein the renderer further receives an indication of a navigation command from the user device, wherein the renderer view further generates an updated layout of the content page based on the navigation command, and wherein the renderer further transmits the updated layout of the content page to the user device over the network for display.

14. The system of claim 8, wherein reception of the request for retrieving content resources causes the user device to obtain the content resources from the host server.

15. The system of claim 8, wherein other renderer processes do not have access to data associated with the first renderer process.

* * * * *